US010114451B2

(12) United States Patent
Martin (10) Patent No.: US 10,114,451 B2
(45) Date of Patent: Oct. 30, 2018

(54) AUGMENTED REALITY IN A VIRTUAL TOUR THROUGH A FINANCIAL PORTFOLIO

(75) Inventor: David Martin, Natick, MA (US)

(73) Assignee: FMR LLC, Boston, MA (US)

( * ) Notice: Subject to any disclaimer, the term of this patent is extended or adjusted under 35 U.S.C. 154(b) by 887 days.

(21) Appl. No.: 13/325,358

(22) Filed: Dec. 14, 2011

(65) Prior Publication Data

US 2012/0242696 A1    Sep. 27, 2012

Related U.S. Application Data

(60) Provisional application No. 61/466,180, filed on Mar. 22, 2011.

(51) Int. Cl.

| G06F 3/01 | (2006.01) |
|---|---|
| G06Q 40/00 | (2012.01) |
| G06T 19/00 | (2011.01) |
| G06Q 10/04 | (2012.01) |
| G06F 3/0481 | (2013.01) |

(52) U.S. Cl.
CPC .......... *G06F 3/011* (2013.01); *G06F 3/04815* (2013.01); *G06Q 10/04* (2013.01); *G06Q 40/00* (2013.01); *G06T 19/003* (2013.01)

(58) Field of Classification Search
CPC ............ B65H 2220/01; B65H 2511/20; B65H 2511/40; B65H 29/12; B65H 29/60; A61B 5/0095; A61B 6/032; A61B 8/0841; A61B 8/4444; A61B 17/320092; G06T 19/006; G06T 11/60; G06T 19/00
USPC ....................................................... 345/633
See application file for complete search history.

(56) References Cited

U.S. PATENT DOCUMENTS

| 6,073,115 A * | 6/2000 | Marshall .......................... 705/35 |
|---|---|---|
| 7,053,916 B2 | 5/2006 | Kobayashi et al. |
| 7,337,325 B2 | 2/2008 | Ikegami et al. |
| 7,493,559 B1 | 2/2009 | Wolff et al. |
| 7,779,450 B2 | 8/2010 | Ohmori |
| 7,991,672 B2 * | 8/2011 | Crowder ...................... 705/36 R |
| 2002/0031756 A1 | 3/2002 | Holtz et al. |
| 2002/0075282 A1 | 6/2002 | Vetterli et al. |
| 2003/0051255 A1 | 3/2003 | Bulman et al. |
| 2004/0001106 A1 | 1/2004 | Deutscher et al. |
| 2004/0233200 A1 | 11/2004 | Karren |
| 2007/0132785 A1 | 6/2007 | Ebersole, Jr. et al. |
| 2007/0237491 A1 | 10/2007 | Kraft |

(Continued)

FOREIGN PATENT DOCUMENTS

| WO | WO2007/010416 | 1/2007 |
|---|---|---|
| WO | 2009/073978 | 6/2009 |

OTHER PUBLICATIONS

International Search Report and Written Opinion; PCT/US2012/029913; dated Jun. 13, 2012; B.R. Copenheaver; 8pp.

(Continued)

*Primary Examiner* — Peter Hoang
(74) *Attorney, Agent, or Firm* — Proskauer Rose LLP (57) ABSTRACT

Disclosed are techniques for providing a presentation as a virtual tour through a user's portfolio based on receiving signals that correspond to user movements in the physical world and processing the signals to select generated images associated with the user's movements to generate an image that when rendered on a display device renders a visual representation of the portfolio in a virtual world.

22 Claims, 7 Drawing Sheets

(56) References Cited

U.S. PATENT DOCUMENTS

| | | | |
|---|---|---|---|
| 2008/0074494 | A1 | 3/2008 | Nemethy et al. |
| 2008/0218331 | A1 | 9/2008 | Baillot |
| 2010/0146608 | A1 | 6/2010 | Batie et al. |
| 2010/0164990 | A1* | 7/2010 | Van Doorn .................. 345/633 |
| 2010/0293108 | A1* | 11/2010 | Gurvitch et al. ........... 705/36 R |
| 2010/0315316 | A1* | 12/2010 | Mihara et al. ................. 345/32 |
| 2011/0018903 | A1 | 1/2011 | Lapstun et al. |
| 2012/0105473 | A1* | 5/2012 | Bar-Zeev et al. ............. 345/633 |
| 2012/0113140 | A1* | 5/2012 | Hilliges et al. ............... 345/633 |
| 2013/0219298 | A9* | 8/2013 | Whalin et al. ................ 715/753 |

OTHER PUBLICATIONS

"Technology; Coming Soon: Data You Can Look Under and Walk Through," Andrew Pollack, http://www.nytimes.com/1990/10/14/business/technology-coming-soon-data-you-can-look . . . 3/_12/2014.

U.S. Appl. No. 13/325,296, filed Dec. 14, 2011, entitled "System for Group Supervision".

U.S. Appl. No. 13/325,289, filed Dec. 14, 2011, entitled "Augmented Reality System for Re-casting a Seminar with Private Calculations".

U.S. Appl. No. 13/325,325, filed Dec. 14, 2011, entitled "Augmented Reality System for Public and Private Seminars".

\* cited by examiner

AUGMENTED REALITY IN A VIRTUAL TOUR THROUGH A FINANCIAL PORTFOLIO

This application claims priority under 35 U.S.C. § 119 to U.S. Provisional Patent Application Ser. No. 61/466,180, filed Mar. 22, 2011, and entitled "Augmented Reality in a Virtual Tour through a Financial Portfolio", the entire contents of which are hereby incorporated by reference.

BACKGROUND

This invention relates to tools to conduct seminars and other group activities.

There are many situations that require display of personal information. Examples include broadcasts of seminars or meetings to individuals. One particular example is a presentation conducted by financial services firms for individuals to review an individual's financial portfolio. Such a presentation is used to present to customers information about their portfolio. Conventionally, such a presentation is conducted either in a face to face meeting with the individual where either a paper copy of details of a portfolio are presented or possible where the details are displayed on a computer monitor, such as viewing financial statements on-line.

SUMMARY

According to an aspect a system includes one or more computer systems configured to retrieve information, receive rules to analyze the information to generate private data of a user pertaining to the information, generate images of a presentation including the private data of the user, receive signals that correspond to user movements in the physical world, process the signals that correspond to user movements to select one of the generated images that corresponds to the user's movements, the generated image selected from a plurality of ordered images, and generate an image that when rendered on a display device renders a visual representation of the image in a virtual world.

According to an additional aspect, a method includes retrieving by one or more computer systems information, receiving by the one or more computer systems rules to analyze the information to generate private data of a user pertaining to the information, generating by the one or more computer systems images of a presentation including the private data of the user, receiving by the one or more computer systems signals that correspond to user movements in the physical world, processing by the one or more computer systems the signals that correspond to user movements to select one of the generated images that corresponds to the user's movements, the generated image selected from a plurality of ordered images, and generating by the one or more computer systems an image that when rendered on a display device renders a visual representation of the image in a virtual world.

According to an additional aspect, a computer program product tangible embodied on a computer readable storage device for providing a presentation includes instructions for causing a processor retrieve information, receive rules to analyze the information to generate private data of a user pertaining to the information, generate images of a presentation including the private data of the user, receive signals that correspond to user movements in the physical world, process the signals that correspond to user movements to select one of the generated images that corresponds to the user's movements, the generated image selected from a plurality of ordered images, and generate an image that when rendered on a display device renders a visual representation of the image in a virtual world.

The above techniques can include additional features. The techniques at least on image has a region, selection of which, in the image causes a next image in the ordered images to be displayed in the virtual world. The techniques generate the image to include public information, select private information that a user of the display device has been authenticated to view, generate a pictorial representation of the private information and augment the image with the pictorial representation of the private information in accordance with public information. The information includes financial information that is publically available and private financial information that is associated with the user. The techniques include a display device configured to receive the generated images. The techniques include a display device configured to receive the generated images, the display device being physically remote. The techniques include a set of eyeglasses comprising the display device, the eyeglasses configured to receive the generated images. The techniques include a set of eyeglasses comprising the display device, the eyeglasses configured to receive the generated images over a wireless connection. The techniques include a portable computing system including a wireless connection configured to receive the generated images and a set of eyeglasses comprising the display device, the display device configured to receive the generated images over the wireless connection. The ordered images in the virtual world comprise a virtual tour through a financial portfolio. An image in the ordered images when rendered on the display device renders a visual representation of one or more investment information, retirement information, savings information, securities information, bond information, and mutual fund information. The images are ordered such that a first image is ordered before a second image, with the system configured to select the second image from a user movement when the user is viewing the first image.

DESCRIPTION OF DRAWINGS

The accompanied figures are to be used in conjunction with the description below.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
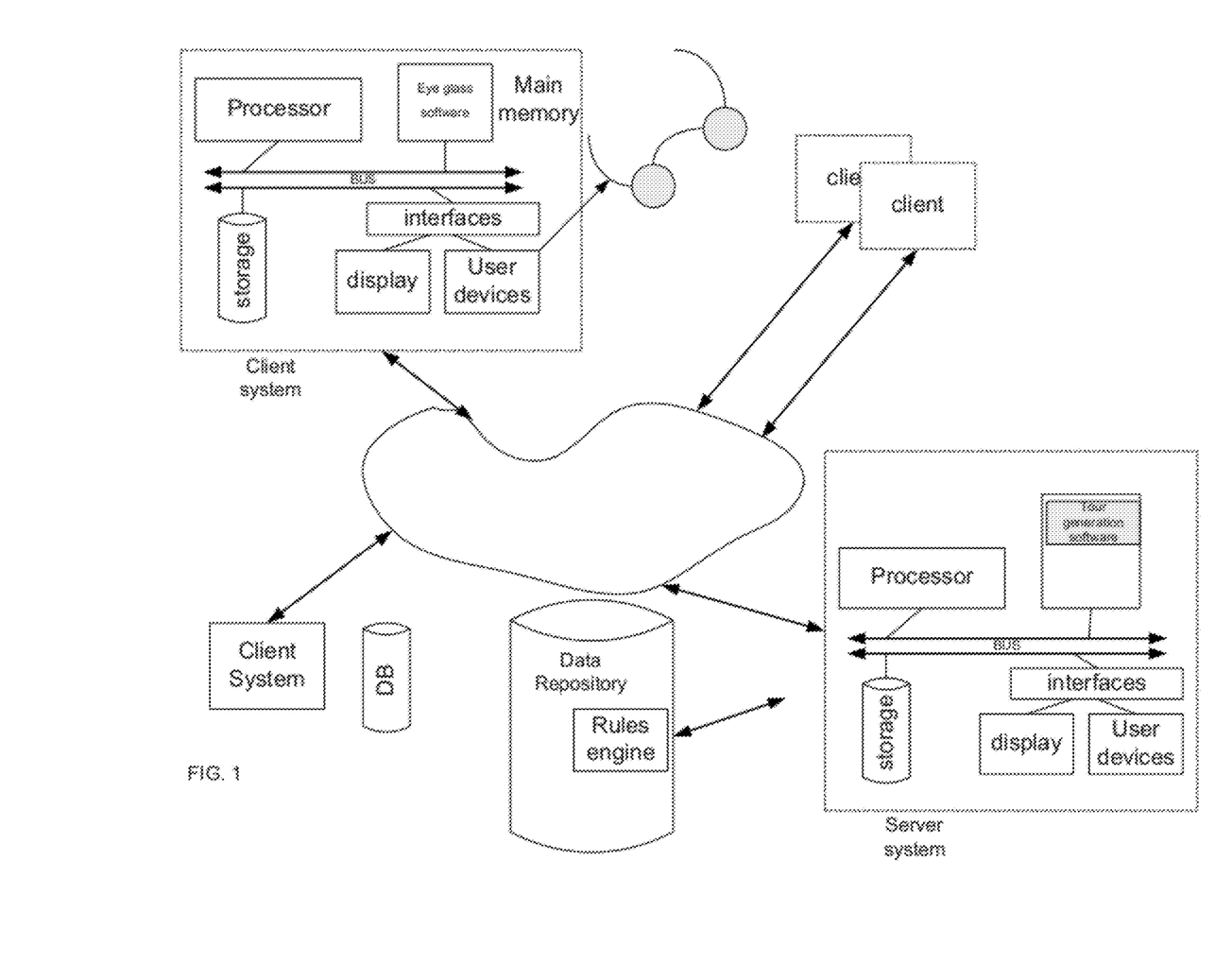
FIG. 1 is a block diagram.

Referring now to FIG. 1, a system 10 includes a server type of system 10 12 comprised of one or more computer system 10s 12a-12i, each computer system 10 12a-12i including a processor, memory and computer storage that stores a computer program product. When executed, the computer program product configures the server 12 to send an information feed or a message stream from the server 12 to one or more client devices, generally 14. The information feeds are received over a network 17 that is wired or wireless and can include the Internet and private networks. The server 12 produces the independent information feeds for the client devices 14 from private information pertaining to different users at each of the client system 10s 14 to produce presentations in the form of virtual tours through users' financial portfolios. The presentations are broadcasted to the client system 10s 14 for users to view in a manner discussed below.

Each individual presentation has private data pertaining to a particular user's financial accounts, such as brokerage accounts, retirement accounts and savings accounts, insurance and so forth. While the system 10 produces plural presentations for plural clients, in general each of the presentations will contain different information that is private to the particular user.

The system 10 includes a database and a rules engine that retrieves private financial information corresponding to users that logged in using the client devices 14, for example, client device 14a. The system 10 processes the retrieved information to extracted relevant private information corresponding to a particular view of the presentation.

The system 10 is configured to provide an investor with a virtual tour of the investor's financial portfolio. In one embodiment, the user, e.g., investor, wears a set of eyeglasses (or the like, such as a headset with built in displays) that are coupled to client devices 14 (or are the client devices when the eyeglasses can receive the generated images directly) that display, generated images of the investor's financial portfolio as generated by the computer system 10.

Figure 2:
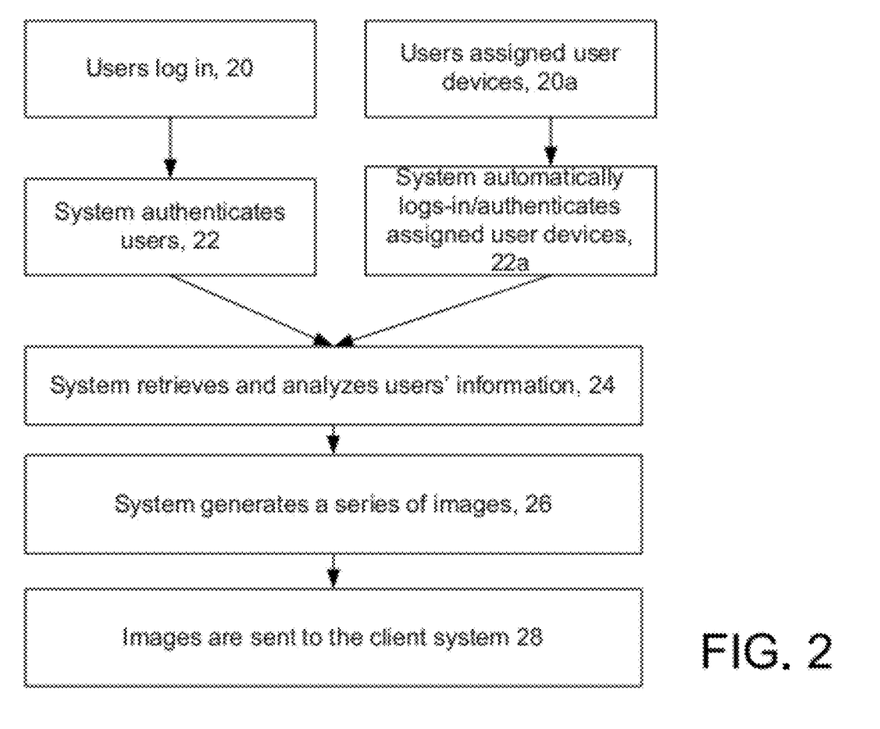
FIG. 2 is a flow chart of a process to generate images of a user's private information.

Referring now to FIG. 2, a user logs 20 into system 10, typically by accessing a web page on the Internet, or as alternative log in procedure, the user is assigned 20a a device and the user's device is automatically logged-in/authenticated 22a when the user device is turned on. Once the user has logged into the server computer 12, the server 12 receives 24 the user's private information from, e.g., server computers/databases of the financial services firm. The private information is for example a user's account information, portfolio of investments and so forth. The server computer 12 generates 26 a series of images that include the user's private information embedded in portions of the image. These images are sent to the client system 14 14, which transfers the images to the user display device (e.g., a set of virtual reality eyeglasses) to enable the user to view the private information.

Figure 3:
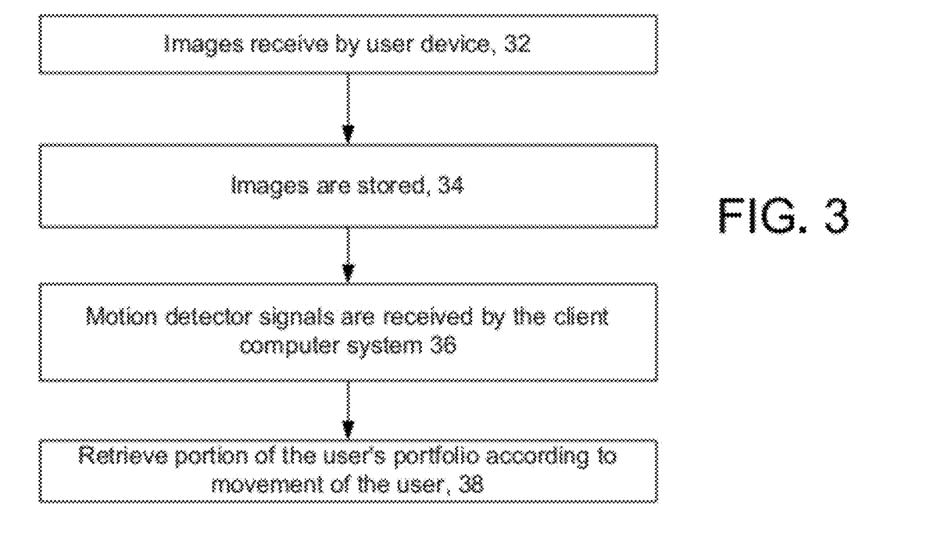
FIG. 3 is a flow chart of a process to navigate through images.

Referring now to FIG. 3, in one implementation, the images produced by the server are received 32 by the client system 14 14 and stored 34 in the client system 14 14. An initial one of the images received, such as an introductory screen (not shown) is sent to the display device to render to the user. Such an introductory screen can include instructions for navigating in the tour, as well a summary, e.g., high level view of the user's accounts. To enable the user to view a virtual augmentation of the private information, the client device 14 receives 36 motion detector signals from motion sensors carried by the user. The user carries motion detectors that produce these signals as the user moves through space. These signals received by the client computer system 10 14 cause the client system 14 to retrieve and display to the user different images. The client system 14 selects 38 a portion of the portfolio, e.g., one of the images received from the client system 14 according to movement of the user in space, in order to present a virtual tour for the user though the user's portfolio.

The system 10 during the log in procedure authenticates the user and retrieves information pertaining to the authenticated user. The server 12 processes that information through a rules engine that examines various factors to ascertain what portion of the information associated with the user to use in generating images. In an example, the displayed data is based upon an identity of the user that logged into the system 10. In this example, two users (e.g., a husband and a wife) are associated with a bank account. The bank account is configured such that only one user has access to view withdrawal and deposit information and that other user has access to view withdrawal information only. Accordingly, the system 10 determines whether to display pictorial representations of the withdrawal and/or deposit information based on the identity of the user that has logged into the system 10. The rules engine processes the information or a portion of the information on a user basis to segregate the private information for a particular user and to filter and/or assemble information based on a particular identity of the user. The output of the rules engine includes the private information for which a particular user has been authenticated to view, e.g., determined, or selected based on, e.g., a segment of the virtual tour. The system 10 retrieves and/or generates a corresponding image(s) of segment components having the private financial information that is relevant to the particular segment of the tour. The system 10 produces a segment component that includes various graphics, such as slides, images, etc. that depict the private information embedded in the presentation.

Assembly can be static or dynamic, meaning that the server can assemble the images as the user moves or assemble all possible images and send to the client system for sequential view based on user movements.

In the example of private financial information, the private financial information may include information specifying a user's stock portfolio, a user's financial contribution limits, a user's investment earnings, and so forth. The private information can be rather simple such as merely producing information that when rendered, as discussed below would produce informational depictions of private information. Alternatively, the informational depictions can include statements generated by the rules engine that summarizes the private information.

In some embodiments, the computer system 10 is also configured to generate part of the virtual tour from public information that all tour participants can view and the public information for the virtual tour is augmented with the private information. In an example, the public information includes information specifying a listing of retirement plans, a list of mutual funds, and so forth. In an example, the user's private information is placed side-by-side (e.g., juxtaposed) with the public information in a manner that allows the user to view the private information while also viewing the public information in the virtual tour.

Figure 4:
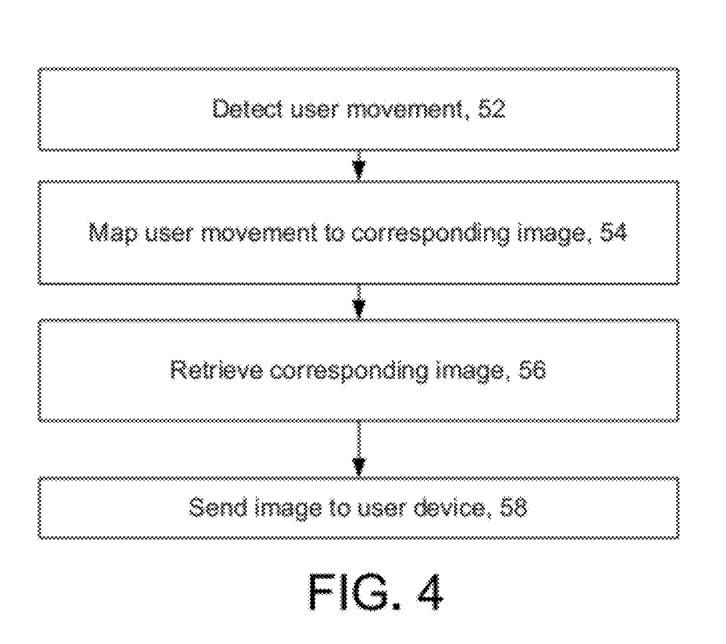
FIG. 4 is a flow chart of an alternative process to navigate.

Referring now to FIG. 4, the system 10 generated a series of images for each of plural segments of the virtual tour, as discussed above. Each segment corresponds to a different portion of the virtual tour. In this example, the segments are associated with different portions of a user's portfolio. For example, one segment can include savings, another retirement accounts and a third investment accounts. A segment of the virtual tour is selected in various ways, such as though the user's movements.

In particular, when the system 10 detects 52 that the user has moved in a specific direction, the system 10 interprets that movement as a request to view a particular segment of the virtual tour corresponding to a particular portion of the user's portfolio through a mapping 54 of the generated images to user movements. The computer system 10 is configured to retrieve 56 the image associated with the user's current detected movement, with the image including the private information (e.g., financial user account information) of the user's that is relevant to the selected segment of the virtual tour and sends 58 the retrieved image to the user's device.

Figure 4A:
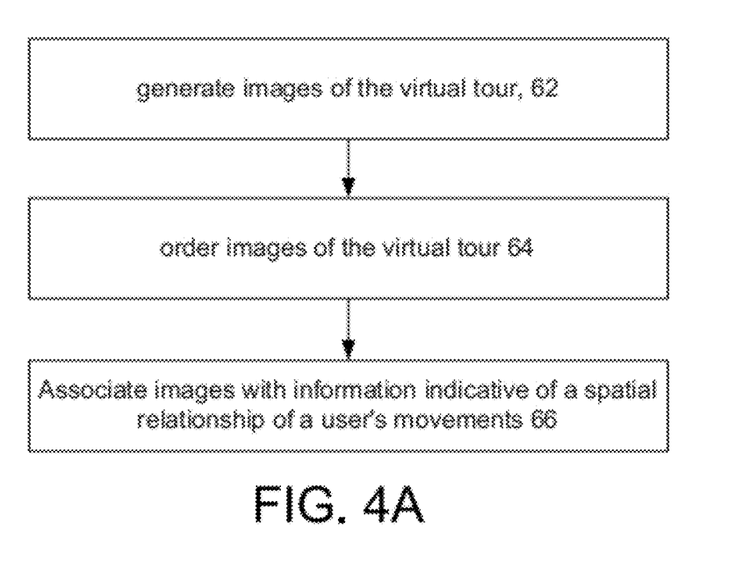
FIG. 4A is a flow chart of a mapping process.

Referring now to FIG. 4A, in an example, the system 10 generates 62 and orders 64 images of the virtual tour. The images are associated 66 with information indicative of a spatial relationship of a user's movements to the ordering of the images within the tour by a mapping of user movements to each of the images forming a relationship of the image to user movements. For example, in a simply mapping each image can be ordered according to how the images are rendered to a user. In this simple mapping when one step in a forward directed is detected by the system 10 (or another equivalent gesture) is detected, the system 10 sends the next image. Conversely, when one step in a backward directed is detected by the system 10 (or another equivalent gesture) is detected the system 10 sends the previous image.

The tour can be arranged into segments, e.g., retirement accounts, personal investing accounts, etc. Tags are produced for each segment, the tags including information that determines what portion of a user's portfolio will be included in the segment. When the system 10 determines that a segment of the virtual tour is requested, e.g., by detecting a user movement or other indicia, the system 10 finds the tag associated with the particular segment associated with the segment. Using the tag the system 10 determines private information of the user that is relevant to the segment. In an example, a segment of the virtual tour is tagged with information specifying that the topic of the segment relates to retirement investing. In this example, the system 10 is configured to retrieve the user's private information that is related to the user's retirement accounts, including, e.g., 401k accounts, pension accounts, and so forth. The system 10 is further configured to send the user's private retirement information for rendering by a client device on which the user is viewing the virtual tour.

Tags correspond to placeholders for personal data of each customer such as charts or tables that are retrieved at run time for the particular customer and such data are overlaid onto streaming content in the presentation making the customer experience a mix of real-time and canned data. For each customer the data that the tags point to are to data for the particular customer. As an example the first tag in the series could be configured to retrieve an "income and expense" chart when the presenter is discussing income and expense. Different instantiations of the chart are populated with data for each of the customers in attendance, making the experience personal for each of the customers.

Figure 5:
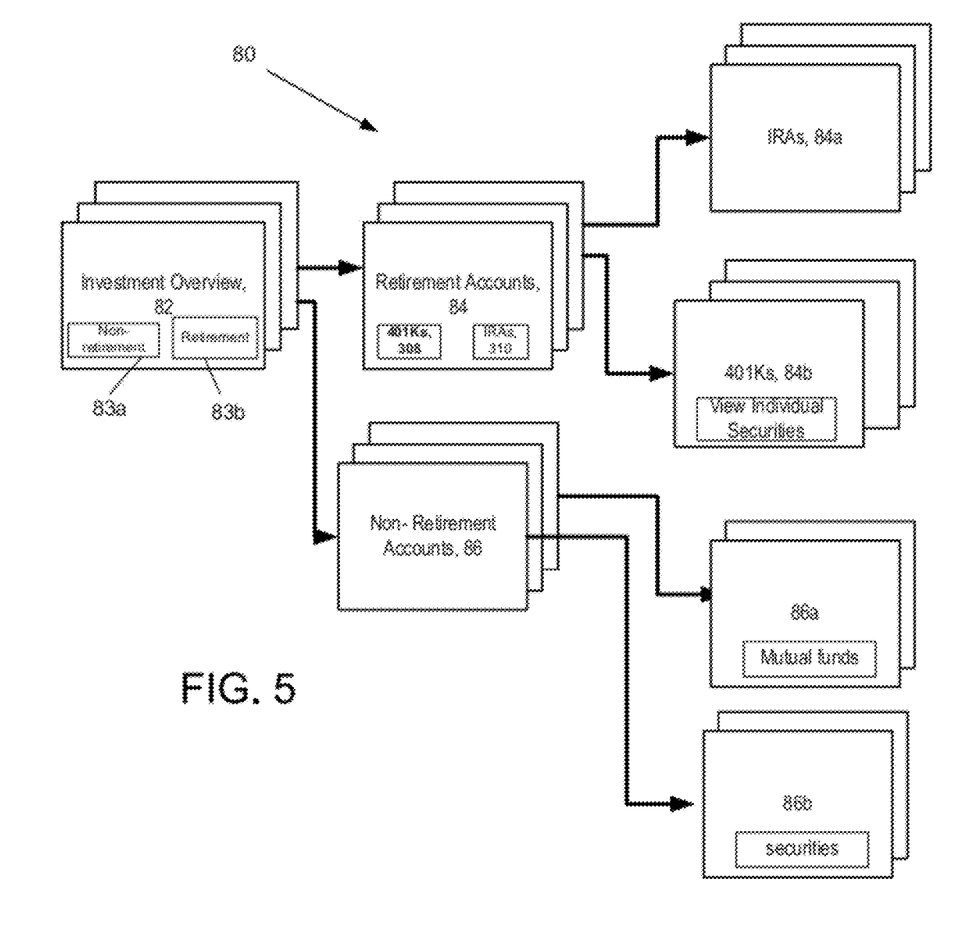
FIG. 5 is diagram depicting an ordered set of images.

Referring to FIG. 5, the system 10 generates images 80 that are indicative of different portions of a user's investment portfolio. In some embodiments the generated images are templates that either depict no details of content in the image or are pre-populated with exemplary content. When a user sends a request, such as by moving, the images are populated with user specific data such as the private information of the user, as determined above.

In this example, images 82 include pictorial representations of one or more overviews of the user's investment portfolio. Images 84 include a pictorial representation of the user's retirement account(s). Images 84a include a pictorial representation of the user's individual retirement account(s) ("IRAs"). Image 84b includes a pictorial representation of the user's 401K retirement account(s). Images 86 include a pictorial representation of the user's non-retirement account(s). Images 86a include a pictorial representation of the user's mutual fund account(s), whereas images 86b include a pictorial representation of the user's, e.g., security accounts.

In each of these images the images have fields, graphics and other depictions that are populated with data corresponding to values of the user's investments. The depicted arrangement of the portfolio is exemplary, it being understood that other arrangements as well as other investment/savings type of accounts/financial products can be depicted.

The computer orders the images 82, 84, 86 according to criteria such as an increasing level of specificity, with image 82 being ordered first, images 84, 86 being ordered after image 82, and images 84a, 84b and 86a, 86b being ordered after images 84 and 86, respectively.

Figure 6:
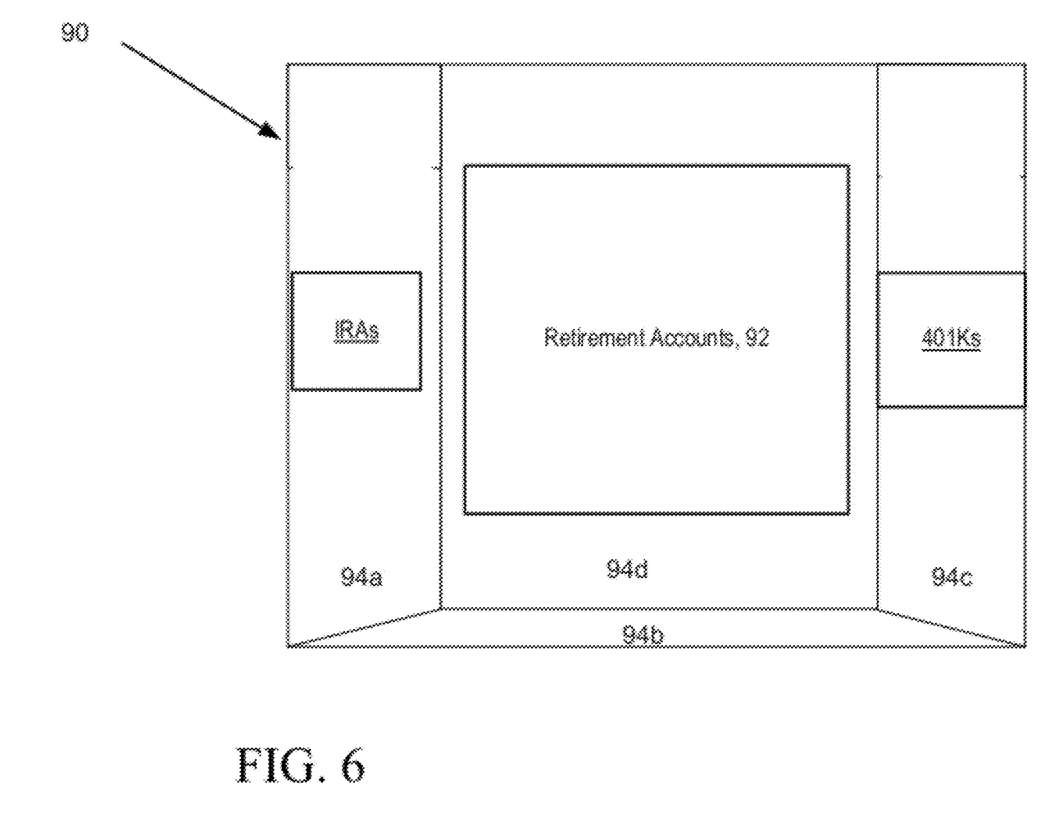
FIG. 6 is a diagram of a virtual room.
Figure 7:
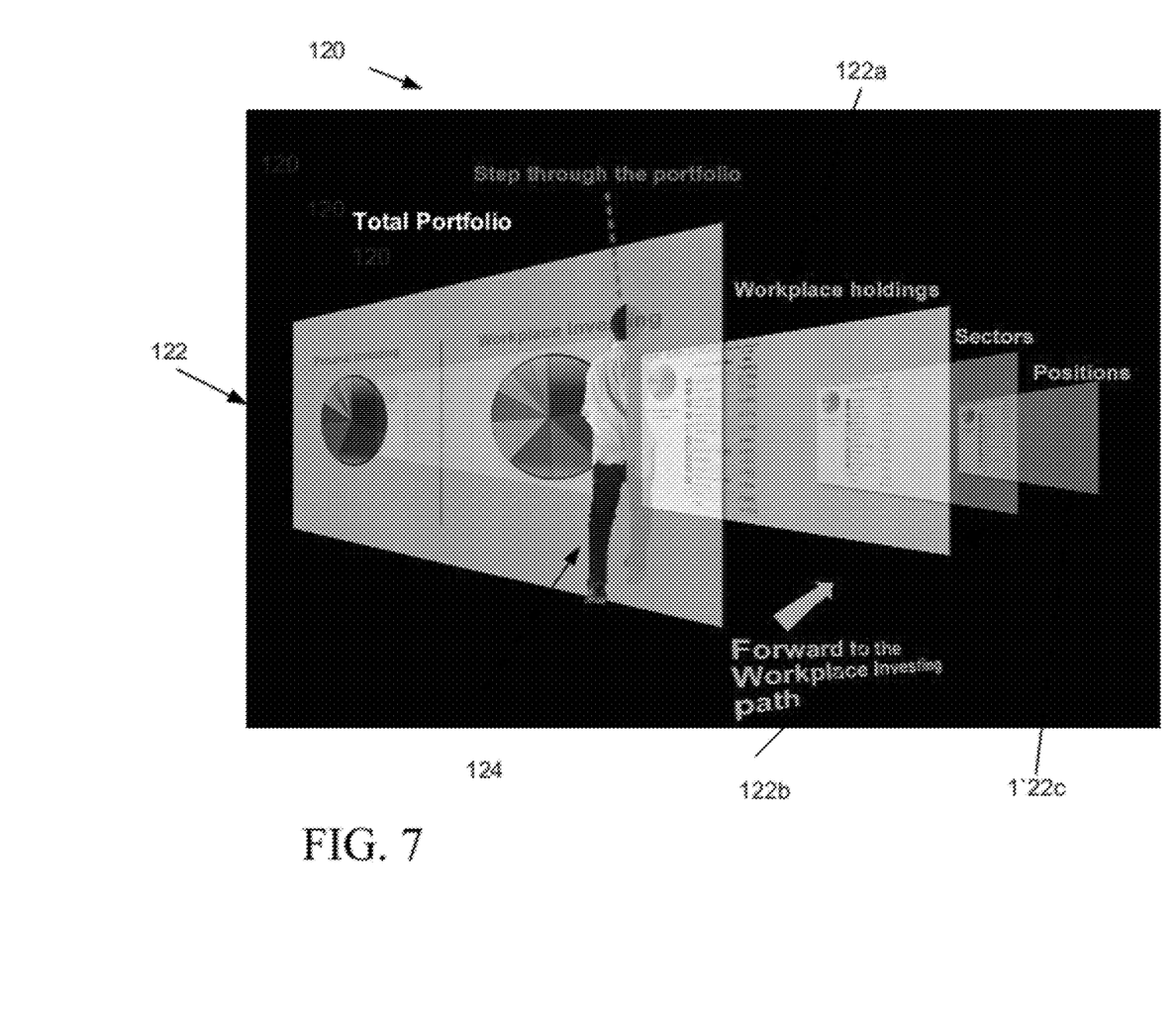
FIG. 7 is a pictorial representation of a portfolio.

The user navigates through the ordered images, for example, as illustrated in FIG. 6 or 7 below. The system 10 can also order the images based on user preferences for the types of information that is displayed.

As the user navigates through the user's financial portfolio, a level of granularity of each image increases, for example, as illustrated in FIG. 5. In one embodiment, the computer generates the images 82, 84, 86 to include selectable portions, selection of which cause the display device on the client system 14 to display another segment of the virtual tour.

For example, image 82 includes selectable portions "retirement" and "non-retirement" selection of which by the user allows the user to navigate to images corresponding to the selection. User selection can be accomplished by gestures that are interpreted by the system 10 as a selection in the virtual tour using convention virtual reality techniques. If the user selects portion 83a, display device renders a pictorial representation of the user's non-retirement (savings/investment) accounts. If the user selects portion 83b, display device renders a pictorial representation of the user's retirement accounts. From image 82, the user can select to navigate to image 84 (e.g., via selection of portion 83b) or to image 84 (e.g., via selection of portion 83a). If the user chooses to navigate to image 84, the user also has the additional option of viewing the user's 401K or IRA retirement accounts. Other types of accounts such as brokerage accounts that hold individual securities, as illustrated, can be viewed in this manner.

Referring to FIG. 6, a perspective view of a virtual room 90 is provided. Virtual room 90 includes walls 94a, 94c and 94d and floor 94b. Wall 94d renders a visual representation of Retirement accounts 92. Wall 94a renders a visual representation of IRAs. Wall 94c renders a visual representation of 401Ks. The details of each of these accounts are not illustrated for clarification purposes. However, these details could be rendered in any one of a number of ways, such as in a typical presentation that the financial institution renders for web-based displays as well as a rendition for paper statements, as well as others.

In one example, the user is physically standing in a position in which the user is facing wall 94d. Motion detectors carried by the user generates signals that are sent to the server including information indicative of the user's position. In response, server generates a visual representation of wall 94d that is larger than the visual representations of walls 94a, 94b to provide the user with the experience of facing wall 94d. As the user moves toward wall 94a in the virtual world based on corresponding movement in the real world, server generates another visual representation of the room with walls 94c and 94d decreasing in size, while wall 94a increases in size relative to the size of walls 94c and 94d. As the user moves toward wall 94c in the virtual world based on corresponding movements in the physical world, server generates another visual representation of wall 94d in which wall 94c increases in size relative to the size of walls 94a and 94d. When the user steps into the virtual room, the display device renders for the user images including relevant information (e.g., public and/or private information) in accordance with the topic that is tagged for the virtual room, as previously described.

The user navigates among images through physical movements in the physical world. As previously described, the user is coupled to a motion detector, carried by the user or a client system 14 associated with the user or the eyeglasses. Using the motion detector, the client system 14 or the server in response to signals generated by the motion detectors generates appropriate images that move the user through the virtual rooms in accordance with the user's movement in the physical world and sends these images to the user eyeglasses.

The motion detector generates signals that correspond to physical movements of the user in the physical world that are translated or interpreted by the server or client system 14 as movement in the virtual room. The virtual room is depicted to the user including information on walls in the virtual room information regarding the user's accounts. The view of that information changes as the user moves towards or away from the walls. In response to receiving the generated signals, the system 10 is configured to enlarge the wall that the user is physically moving towards. Additionally, the motion detector is also configured to generate signals indicative of whether the user is moving to the left or to the right in the physical world. When the server receives signals specifying that the user is moving to the right in the physical world, the server renders a visual representation of the room in accordance with the user's physical movements. In particular, the wall on the right side of the virtual room is enlarged to reflect the user's physical movement of moving in the right direction, while the walls in the center or the left either shrink in size or are removed from the user's view.

Thus, when the user is in virtual room 90 various ones of the images from FIG. 5 are displayed. If the user moves in the physical world, the client or server system 10 generates/sends the appropriate such that certain ones of the images are displayed on the walls in the room with certain of the images enlarged and others rendered smaller in accordance with the user's position in the room. This would be similar to a user being in a physical room facing one wall directly and with the user's peripheral vision capturing portions of the walls on the side. When the user moves to, e.g., the right in the physical world, then the client system 14 generates the image with the wall on the right enlarged in comparison to the other walls.

The virtual room is arranged in numerous ways, including, the images displayed on the walls of the room and/or as the images displayed in the room as floating images in the virtual room (discussed below). The virtual room is also configured to display financial information from numerous, different financial institutions. In an example, one wall of the virtual room renders a visual representation of information indicative of a user's retirement account in a financial institution. Another wall in the virtual room renders a visual representation of the user's stock portfolio from that financial institution, or in some embodiments, from another, different financial institution. In this example, the system 10 receives, from different financial institutions, numerous, different information feeds. The system 10 is configured to parse the information feeds to generate and to render the visual representations of financial information included in the information feeds.

Alternatively, rather than physically navigating the user navigates among images (generally 90) through virtual selection of virtual links.

In some embodiments, the various portions of the investor's portfolio are displayed in plural virtual rooms that the investor views through the displays in the set of eyeglasses. The investor moves through the portfolio to view different portions of the portfolio by physically moving in space to cause the tour to move among the virtual rooms. The physical movement used by the investor to move among the virtual rooms can include various types of movements such as gestures or walking. For example, the user also has a motion detector that detects when the investor moves.

The motion detectors can be part of the eyeglasses or can be separate therefrom. In any event, the motion detectors are carried by the user. When the motion detector(s) detect the user moving to the right, the investor is indicating that the investor wants to move into a virtual room that is displayed as being on the right side of the image projected in the display device. In particular, the investor's movement through the virtual world (e.g., a virtual tour) tracks the investor's movement in the physical world.

Referring to FIG. 7, an alternative pictorial representation 120 is provided for a user to view images of a financial portfolio 122 in a virtual world. Using the augmented reality techniques described herein, the user views the images 122 of the user's "portfolio" as well as an image 124 of the user. In particular, as the user walks through the physical world, the image 124 of the user walks through ordered images of the portfolio 122 to view various portions of the user's financial portfolio.

As illustrated in FIG. 7, the user walks through the user's financial portfolio, navigating through the various images by walking in the physical world. Images generated by the system 10 provide the user with pictorial representations of the user's workplace holdings 122a, sector holdings 122b, and various financial positions 122c. The system 10 is configured to select information pertaining to the workplace holdings 122a, sector holdings 122b, and various financial positions 122c and generates images displaying information indicative of the workplace holdings 122a, sector holdings 122b, and various financial positions 122c of the user. As the user moves towards certain images and/or selects portions of an image, the system 10 is configured to display additional images for the user providing the user with the experience of walking and/or moving through the user's financial portfolio.

Figure 8:
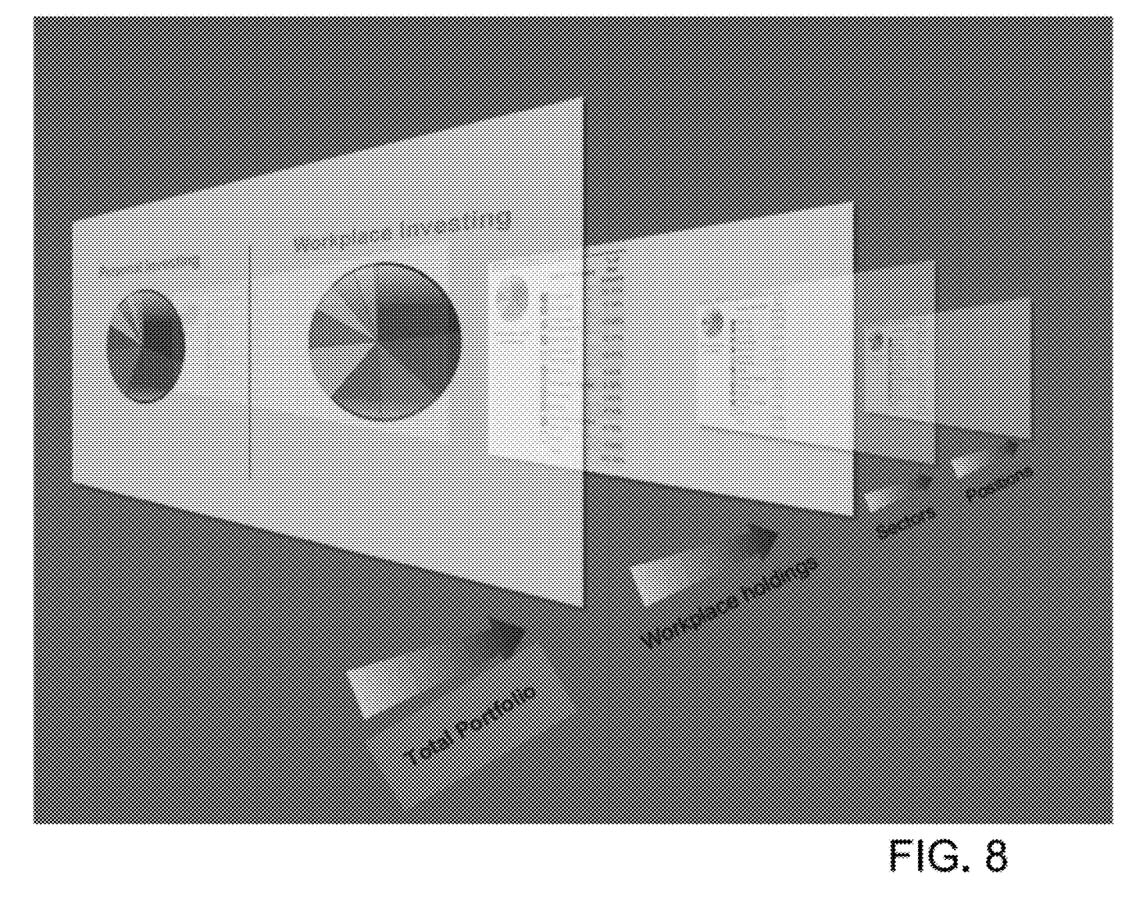
FIG. 8 is another pictorial representation of a portfolio.

FIG. 8 illustrates another pictorial representation of a portfolio without a depiction of a user that can be viewed as a user traverses through the portfolio.

In either of the views of FIG. 7 or FIG. 8 "ghost" images (images that are later in the tour than a current image, as shown in phantom) are shown in the background. These "ghost" images can be viewed by the user as the user walks through the virtual tour, which while engaging may be confusing, or can be suppressed and only displayed one at a time as the user walks far enough into the virtual tour to be at a position that corresponds to a particular image.

The system 10 is configured to generate numerous, different types of images for different portions of the user's financial portfolio, e.g., the user's personal investment information and the user's workplace investment information. Based on whether the user chooses to view personal investment information or workplace investment information, the system 10 is configured to display for the user a different, ordered set of images, with one set pertaining to personal investment information and with the other set pertaining to workplace investment information, as generally discussed above.

In some embodiments, a user (such as an investor that invests with a financial institution) would be outfitted with a display device that is configured to receive the generated image. The display device can be configured to receive the generated image, and is physically remote from the one or more computer system 10s. The display device in some embodiments is a set of eyeglasses that include display devices configured to receive generated images and to display the generated images.

The set of eyeglasses can be configured to receive the generated image over a wireless connection. The system 10 can further include a portable computing system 10 including a wireless connection configured to receive the generated images and provide processing to the images to send to the set of eyeglasses. In some embodiments the portable computing system 10 provides processing to form the images from data received from the server.

While eyeglasses or a display device can be used other types of augmenting media devices can be configured to receive the generated image.

In an example, the set of eyeglasses include a control device through which the user can log into the computer system 10. In another example, the user uses a separate client device to log into the computer system 10 and the user separately is authenticated with a set of eyeglasses, for example, by entering a security code into a control device of the eyeglasses. Once the user has been authenticated as authorized to view the private financial information through a particular set of eyeglasses, the user's private financial information is sent the eyeglasses as part of the virtual tour.

A block diagram of components of the system 10 is also shown. User devices can be any sort of computing device capable of taking input from a user and communicating over a network (not shown) with server and/or with other client devices. For example, user device can be a mobile device, a desktop computer, a laptop, a cell phone, a private digital assistant ("PDA"), a server, an embedded computing system 10, a mobile device, as well as the eyeglasses, and so forth. User devices include monitor which render visual representations.

Server can be any of a variety of computing devices capable of receiving information, such as a server, a distributed computing system 10, a desktop computer, a laptop, a cell phone, a rack-mounted server, and so forth. Server may be a single server or a group of servers that are at a same location or at different locations.

Server can receive information from client device user device via interfaces. Interfaces can be any type of interface capable of receiving information over a network, such as an Ethernet interface, a wireless networking interface, a fiber-optic networking interface, a modem, and so forth. Server also includes a processor and memory. A bus system (not shown), including, for example, a information bus and a motherboard, can be used to establish and to control information communication between the components of server.

Processor may include one or more microprocessors. Generally, processor may include any appropriate processor and/or logic that is capable of receiving and storing information, and of communicating over a network (not shown). Memory can include a hard drive and a random access memory storage device, such as a dynamic random access memory, machine-readable media, or other types of non-transitory machine-readable storage devices.

Components also include storage device, which is configured to store information, map, map templates, rules information for the rules, software for the rules engine, etc. In the illustrative example of FIG. 1, a data repository is configured to store the rules engine. The rules engine includes instructions that when executed by the processors cause the system 10 to perform the techniques described herein.

Embodiments can be implemented in digital electronic circuitry, or in computer hardware, firmware, software, or in combinations thereof. Apparatus of the invention can be implemented in a computer program product tangibly embodied or stored in a machine-readable storage device and/or machine readable media for execution by a programmable processor; and method actions can be performed by a programmable processor executing a program of instructions to perform functions and operations of the invention by operating on input information and generating output. The invention can be implemented advantageously in one or more computer programs that are executable on a programmable system 10 including at least one programmable processor coupled to receive information and instructions from, and to transmit information and instructions to, a information storage system 10, at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and special purpose microprocessors. Generally, a processor will receive instructions and information from a read-only memory and/or a random access memory. Generally, a computer will include one or more mass storage devices for storing information files; such devices include magnetic disks, such as internal hard disks and removable disks; magneto-optical disks; and optical disks. Storage devices suitable for tangibly embodying computer program instructions and information include all forms of volatile and non-volatile memory, including by way of example semiconductor memory devices, such as RAM, EPROM, EEPROM, and flash memory devices; magnetic disks such as internal hard disks and removable disks; magneto-optical disks; and CD_ROM disks. Any of the foregoing can be supplemented by, or incorporated in, ASICs (application-specific integrated circuits).

Other embodiments are within the scope and spirit of the description claims. For example, due to the nature of software, functions described above can be implemented using software, hardware, firmware, hardwiring, or combinations of any of these. In an example, the private information includes private educational information or private medical information, and so forth. Features implementing functions may also be physically located at various positions, including being distributed such that portions of functions are implemented at different physical locations.

What is claimed is:

1. A system comprising:
one or more computer systems configured to:
retrieve from a computer database system information;
analyze the retrieved information to generate private information of a user, with the generated private information pertaining to a customizable presentation that has plural fields for inserting private information;
add into the fields of the customizable presentation the generated private information according to tags associated with the fields in the customizable presentation to produce a customized presentation;
generate, an ordered collection of images of the customized presentation, at least some of the images including the generated private information of the user;
cause a display device to render a selected one or more of the generated images of the customized presentation in a virtual world, by the system configured to:
receive signals that correspond to ambulatory movements of the user in the physical world; and
process the signals that correspond to the ambulatory movements of the user in the physical world to cause a corresponding ambulatory movement of a virtual representation of the user through the virtual world with the ambulatory movement used to determine at least in part the selected one or more of the ordered generated images corresponding to the user's ambulatory movements in the physical world.

2. The system of claim 1 wherein at least on image has a region, selection of which, in the image causes a next image in the ordered images to be displayed in the virtual world.

3. The system of claim 1, wherein the one or more computer systems are further configured to:
generate the image to also include public information;
select the private information that the user of the display device has been authenticated to view;
generate a pictorial representation of the private information; and
augment the image with the pictorial representation of the private information in accordance with public information.

4. The system of claim 1 wherein the information comprises financial information that is publically available and private financial information that is associated with the user.

5. The system of claim 1, wherein the display device is configured to receive the generated images.

6. The system of claim 1, wherein the display device configured to receive the generated images, the display device being physically remote from the one or more computer systems.

7. The system of claim 5, further comprising:
a set of eyeglasses comprising the display device, the eyeglasses configured to receive the generated images.

8. The system of claim 5, further comprising:
a set of eyeglasses comprising the display device, the eyeglasses configured to receive the generated images over a wireless connection.

9. The system of claim 1, further comprising:
a portable computing system including
a wireless connection configured to receive the generated images; and
a set of eyeglasses comprising the display device, the display device configured to receive the generated images over the wireless connection.

10. The system of claim 1, wherein the ordered images in the virtual world comprise a virtual tour through a financial portfolio.

11. The system of claim 10 wherein an image in the ordered images when rendered on the display device renders a visual representation of one or more investment information, retirement information, savings information, securities information, bond information, and mutual fund information.

12. The system of claim 1 wherein the images are ordered such that a first image is ordered before a second image, with the system configured to select the second image from a user movement when the user is viewing the first image.

13. A method comprising:
retrieving by one or more computer systems information from a computer database;
analyzing the retrieved information by the one or more computer systems to generate private information of a user pertaining to a customizable presentation that has plural fields for inserting private information;
adding by the one or more computers the generated private information into the fields of the customizable presentation according to tags associated with the fields in the customizable presentation to produce a customized presentation;
generating by the one or more computer systems an ordered collection of images of the customized presentation, at least some of the images including the generated private information of the user;
causing a display device to render a selected one or ones of the generated images of the customized presentation in a virtual world, by:
receiving by the one or more computer systems signals that correspond to ambulatory movements of the user in the physical world;
processing by the one or more computer systems the signals that correspond to the ambulatory movements of the user the physical world to cause a corresponding ambulatory movement of the user through the virtual world, with the ambulatory movement used to determine at least in part the selected one or more of the ordered generated images corresponding to the user's ambulatory movements in the physical world.

14. The method of claim 13 wherein at least one image has a region, selection of which, in the image causes a next image in the ordered images to be displayed in the virtual world.

15. The method of claim 13 further comprising:
generating the image to also include public information;
selecting the private information that the user of the display device has been authenticated to view;
generating a pictorial representation of the private information; and
augmenting the image with the pictorial representation of the private information in accordance with public information.

16. The method of claim 13 wherein information includes financial information that is publically available and private financial information that is associated with the user.

17. The method of claim 13 wherein the images are ordered such that a first image is ordered before a second image, with the one or more computer systems configured to select the second image from the user movement when the user is viewing the first image.

18. A computer program product tangibly stored on a computer readable hardware storage device the computer program product comprising instructions executable by a processor to:

retrieve from a computer database system information;

analyze the retrieved information to generate private information of a user, with the generated private information pertaining to a customizable presentation that has plural fields for inserting private information;

add into the fields of the customizable presentation the generated private information according to tags associated with the fields in the customizable presentation to produce a customized presentation;

generate, an ordered collection of images of the customized presentation, at least some of the images including the generated private information of the user;

cause a display device to render a selected one or more of the generated images of the customized presentation in a virtual world, by the system configured to:

receive signals that correspond to ambulatory movements of the user in the physical world; and process the signals that correspond to the ambulatory movements of the user in the physical world to cause a corresponding ambulatory movement of a virtual representation of the user through the virtual world with the ambulatory movement used to determine at least in part the selected one or more of the ordered generated images corresponding to the user's ambulatory movements in the physical world.

19. The computer program product of claim 18, further comprising instructions to:

generate the image to also include public information;

select the private information that the user of the display device has been authenticated to view;

generate a pictorial representation of the private information; and augment the image with the pictorial representation of the private information in accordance with public information.

20. The computer program product of claim 18, wherein the ordered images in the virtual world comprise a virtual tour through a financial portfolio.

21. The computer program product of claim 18, wherein an image in the ordered images when rendered on the display device renders a visual representation of one or more investment information, retirement information, savings information, securities information, bond information, and mutual fund information.

22. The computer program product of claim 18, wherein the images are ordered such that a first image is ordered before a second image, with the process configured to select the second image from movement when the user is viewing the first image.

* * * * *